UNITED STATES PATENT OFFICE.

ARTHUR WALL, OF SHADWELL, ENGLAND.

IMPROVEMENT IN COMPOUNDS FOR COATING METALLIC SURFACES TO PREVENT OXIDATION.

Specification forming part of Letters Patent No. 2,136, dated June 22, 1841.

*To all whom it may concern:*

Be it known that I, ARTHUR WALL, of 71 Wapping Wall, Shadwell, in the county of Middlesex, in that part of the Kingdom of Great Britain called England, surgeon, have invented a new Composition for the Prevention of Corrosion in Metals; and I do hereby declare that the following is a full and exact description of it.

To enable others skilled in the art to use my invention, I will proceed to describe the mode of manufacturing the same and the application thereof.

I place twenty pounds of the strongest muriatic acid, diluted with about three gallons of water, in a shallow pan or vessel made of cast-iron. I then take one hundred and twelve pounds of filings of either steel or bar-iron or other wrought-iron. I heat them to redness and throw them into the mixture of acid and water for the purpose of oxidizing the filings. I then place the pan on a sand bath, (heated by a flue from a furnace,) which digests the filings and facilitates the oxidation. I repeatedly stir up the whole, and after subjecting them to this process for about twenty-four hours, or until ebullition takes place and the greater part of the filings is taken up by the liquor or mixture, I allow the oxides thus obtained to run off through a tap into a vessel beneath, leaving the metal not operated upon at the bottom. When these oxides are quite settled the clear mixture or liquor is run off from them into a third vessel, and then the filings must be subjected to the same process in the original mixture to complete the oxidation—that is, they must be again made red-hot and the mixture which has run into the third vessel thrown upon them; and this process must be repeated until all the filings have oxidized that can be made to do so. The oxides thus obtained I now expose on an iron plate made red-hot over a furnace until all moisture has evaporated from them and they assume a red appearance. I then mix with them sixteen pounds of quicksilver by sifting it through a very fine wire sieve onto the oxides, and afterward I intimately mix it with them by rubbing the whole down in a mortar or other suitable process, and when so mixed I then add as much water as will cover the surface and from eight to nine pounds of strong nitric or nitrous acid, and again place the whole on the furnace-plate or sand bath, and repeatedly stir it until all the menstruum or liquor has nearly or completely evaporated. I then place the whole mass in a mortar or other pounding-machine and bray or pound it until it is in a complete state of blackness. I then mix it with water and stir or wash it until all the light particles are washed out. I then allow it to settle, and when the settlement has taken place the water is poured off from the sediment at the bottom. This sediment I then place in a crucible or earthen retort with a receiver attached, adapted for the reception of any chloride or mercury that may escape or come over. The contents of this receiver I preserve, in order to readd to the general mass afterward when cool. Then I make it red-hot, and when in this state I plunge it into fresh boiling water and stir it for a few minutes, and then allow it to settle. I then pour the water off, let it cool, and add the chloride, as before stated; and after the last-mentioned process I add to it one-fourth its own weight of common black lead or minium, commonly called "red lead," according to the color which the operator wishes the composition to assume. Previously to applying this composition to metals I add to it such a quantity of a mixture of boiled linseed-oil and spirits of turpentine (in the proportion of one-fifth of spirits of turpentine to the oil used) as will reduce it to a state sufficiently liquid to be spread with a brush. This preparation I then apply as thinly as possible by means of a brush to sheets of copper or other metal, which sheets I afterward subject to a heat gradually raised to about 300° of Fahrenheit's thermometer, so as to make the metal imbibe the preparation. This heat must be applied to the sheets of prepared metal without smoke or flame by placing the sheets on trucks in contact with the flue-plates, in the manner hereinafter described. The mode of applying this heat may be various; but in order the more distinctly to explain my meaning and my mode of operating, I shall proceed to describe the furnace which I use and find to answer the purpose.

I erect two or more horizontal flues, the construction and dimensions of which may be varied according to circumstances, which flues should gradually decline toward the extreme end from the furnace-bars, so as to produce a good draft and communicate a stronger heat to the plates above next mentioned. These flues I cover with cast-iron plates. I then raise the exterior walls of the furnace to the height of about three to six feet above the iron plates, which walls must be bound with iron braces to prevent them from cracking from the excessive heat. I then place thin sheets of iron slightly curved, thus forming a roof, and rest them on the exterior walls. Each end of the chamber thus formed is closed by an iron plate made to slide up and down by a pulley, so as to act as a damper and let out or confine the heat. The heat from the flues is carried away by a common chimney which has a damper in it for the purpose of controlling the heat.

The sheets of metal prepared with the composition, as above described, are then placed upon iron trucks between upright pins which run on wheels of four inches in diameter, and are thus placed over the iron plates made hot by the flues, the heat must be gradually applied to prevent the composition from blistering on the metal by the trucks being first placed at the extreme end from the furnace-bars and gradually rolled over the flue-plates till evaporation ceases and the metal assumes a dark appearance. This completes the operation.

When preparing iron tanks with the composition I apply the furnace-heat merely sufficient at first to expel the moisture from the metal, and when in that state I take them out and sprinkle over them as much charcoal, very finely pounded, as will be absorbed by the metal, which gives to the metal when prepared a glossy appearance. I then apply the stronger heat and the operation is completed.

Now, I do not claim as any part of my said invention any of the separate processes or the use of any vessels or furnaces; but

What I claim as my invention, and desire to secure by Letters Patent, is—

The composition prepared as above described for the prevention of corrosion in metals, and for other purposes.

ARTHUR WALL.

Witnesses:
   H. ARNOLD,
   HENRY RD. BURN.
*Solicitors, 12 Clements Lane, London.*